United States Patent
Margolin et al.

(10) Patent No.: US 12,518,159 B2
(45) Date of Patent: Jan. 6, 2026

(54) FEATURE-INSENSITIVE MACHINE LEARNING MODELS

(71) Applicant: PAYPAL, INC., San Jose, CA (US)

(72) Inventors: Itay Margolin, Pardesiya (IL); Oria Domb, Tel Aviv (IL)

(73) Assignee: PAYPAL, INC., San Jose, CA (US)

(*) Notice: Subject to any disclaimer, the term of this patent is extended or adjusted under 35 U.S.C. 154(b) by 891 days.

(21) Appl. No.: 17/708,870

(22) Filed: Mar. 30, 2022

(65) Prior Publication Data

US 2023/0316064 A1    Oct. 5, 2023

(51) Int. Cl.
 *G06N 3/08* (2023.01)

(52) U.S. Cl.
 CPC ...................... *G06N 3/08* (2013.01)

(58) Field of Classification Search
 CPC ........................................ G06N 3/08
 See application file for complete search history.

(56) References Cited

U.S. PATENT DOCUMENTS

| | | | |
|---|---|---|---|
| 11,422,996 B1* | 8/2022 | Muhlstein | G06F 16/22 |
| 2021/0248192 A1* | 8/2021 | Lu | G06F 40/284 |
| 2021/0327412 A1* | 10/2021 | Podgorny | G06N 20/20 |
| 2022/0253856 A1* | 8/2022 | Wong | G06N 3/088 |
| 2024/0104350 A1* | 3/2024 | Bachrach | G06N 3/047 |

OTHER PUBLICATIONS

Zhao, Sicheng, et al. "Multi-source distilling domain adaptation." Proceedings of the AAAI conference on artificial intelligence. vol. 34. Feb. 7, 2020. (Year: 2020).*

* cited by examiner

*Primary Examiner* — Alexey Shmatov
(74) *Attorney, Agent, or Firm* — Haynes and Boone, LLP

(57) ABSTRACT

Methods and systems are presented for providing a framework that configures a machine learning model to be insensitive to changes in input features. A computer modeling system determines data sources from which attribute values associated with transactions can be obtained. Instead of configuring the machine learning model to accept the attribute values as inputs, the computer modeling system may configure the machine learning model to accept a vector representation in a multi-dimensional space as input values. The computer modeling system then generates an encoder for each data source. Each encoder is configured to encode attribute values from a corresponding data source to a representation representing the attribute values. Further, each encoder is trained to minimize a variance between outputs of the different encoders. The computer modeling system determines a vector representation based on the representations generated by the encoders and provide the vector representation to the machine learning model.

20 Claims, 8 Drawing Sheets

FEATURE-INSENSITIVE MACHINE LEARNING MODELS

BACKGROUND

The present specification generally relates to machine learning models, and more specifically, to a framework for configuring a machine learning model that can operate independent of the availability of at least some of its data sources according to various embodiments of the disclosure.

RELATED ART

Machine learning models have been widely used to perform various tasks for different reasons. For example, machine learning models may be used in classifying data (e.g., determining whether a transaction is a legitimate transaction or a fraudulent transaction, determining whether a merchant is a high-value merchant or not, determining whether a user is a high-risk user or not, etc.). To construct a machine learning model, a set of input features that are related to performing a task associated with the machine learning model are identified. Training data that includes attribute values corresponding to the set of input features and labels corresponding to pre-determined prediction outcomes may be provided to train the machine learning model. Based on the training data and labels, the machine learning model may learn patterns associated with the training data, and provide predictions based on the learned patterns. For example, new data (e.g., transaction data associated with a new transaction) that corresponds to the set of input features may be provided to the machine learning model. The machine learning model may perform a prediction for the new data based on the learned patterns from the training data.

While machine learning models are effective in learning patterns and making predictions, the machine learning models are typically inflexible regarding the input features used to perform the tasks once they are configured and trained. In other words, once a machine learning model is configured and trained to perform a task (e.g., a classification, a prediction, etc.) based on the set of input features, input values that correspond to the set of input features are required for the machine learning model to perform the task. The unavailability of certain input features may cause a reduction in accuracy performance for the machine learning model or an inability for the machine learning model to perform the task. To change the set of the input features for a machine learning model (e.g., adding a new input feature, removing an input feature, etc.), it is typically required to reconfigure and retrain the machine learning model, which is often both resource and time consuming. However, it is foreseeable that certain input features may become unavailable (e.g., a disruption of a service, etc.) or new features that are found to be relevant in performing the task over time (e.g., an acquisition of a new service, etc.). As such, there is a need for providing a more flexible machine learning model framework that can be adapted in performing a task with different feature sets without requiring reconfiguring or retraining a machine learning model.

Figure 1:
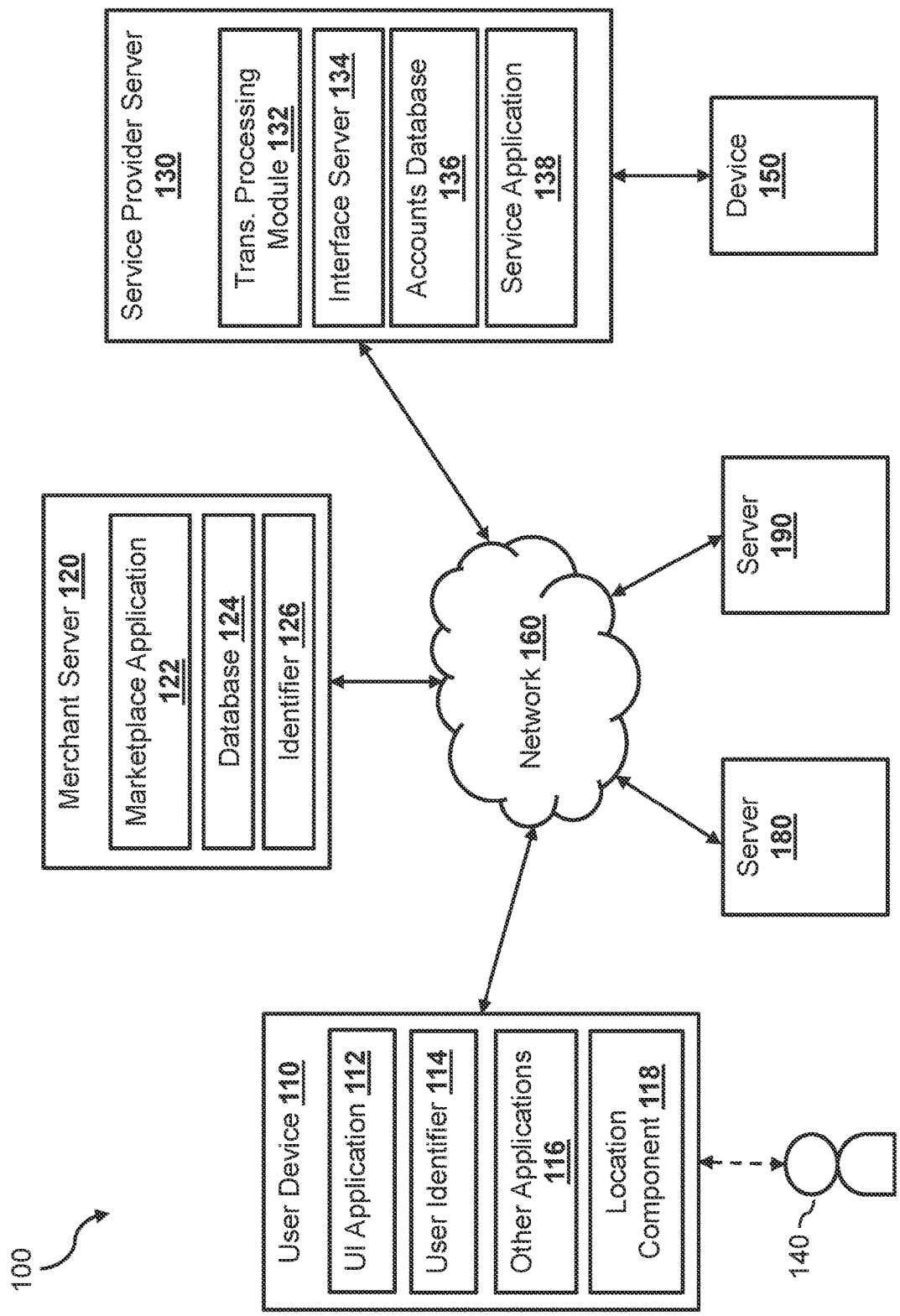
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a computer modeling system that configures machine learning models to be insensitive to changes in input feature sets. As discussed herein, conventional machine learning models are typically inflexible with respect to any changes to the input features once the machine learning models are configured and trained. A change to the input features (e.g., adding a new input feature, removing an input feature, etc.) typically requires reconfiguring and retraining the machine learning model (or configuring and training a new machine learning model), which can consume both computer resources and time. As such, conventional machine learning models are incapable to adapt to disruptions to certain input data, which may lead to disruptions or reduction in performance of certain services performed by the machine learning models.

For a machine learning model that is configured by an organization to determine a risk of an electronic transaction (e.g., an electronic payment transaction between a user and a merchant, etc.), the machine learning model may be configured to receive input data corresponding to a set of input features and from different data sources. The set of input features may include features that are obtainable from an internal data source (e.g., an internal database system, an internal data processing system, etc.), such as past transactions conducted by the user, device attributes of devices associated with the user, past locations of the user, etc. The set of input features may also include features that are obtainable from one or more external data sources (e.g., a company analytics data provider such as Dun & Bradstreet®, a web intelligence analytics data provider, etc.), such as a credit score and other information of the merchant, past web traffic of a website associated with the merchant, etc. The machine learning model may be trained using historic data corresponding to the set of input features to perform a task (e.g., determining a risk of an electronic transaction, etc.).

Since the machine learning model relies on data from the different data sources (and some of which are external data sources that may not be under control of the organization), some of the input features may become unavailable due to various reasons. For example, a data source may become unavailable due to a decision made by the organization to stop acquiring data from that data source, a dissolution of the data source, an interruption to the computer services provided by the data source, etc. When a data source becomes unavailable, the organization may no longer obtain data from that data source for the machine learning model to perform the task. Since the machine learning model was configured to receive the input data from the data source, and was trained based on historical data from the data source, the unavailability of the input data may prevent the machine learning model from functioning properly, and at best may cause a substantial reduction in accuracy performance for the machine learning model, or worse, provide an erroneous prediction that the organization relies upon in making a decision about a transaction or other processing.

In another example, the organization may have access to a new data source after the machine learning model has been configured and trained. While the new data source may provide insightful information that would help in performing the task, the machine learning model may not be able to take advantage of the new data source based on its existing configuration and training.

Conventionally, machine learning models are inflexible with respect to input features such that any modifications to the input features (e.g., adding a new input feature, removing an input feature, etc.) of a machine learning model require reconfiguration and retraining of the machine learning model. Consider a machine learning model that is implemented as an artificial neural network. Once a particular set of input features is determined for the neural network, a set of input nodes corresponding to the input features are generated for the neural network. Connections between the input nodes and the hidden nodes in hidden layers are also provided based on the set of input features. Through training the neural network using training data corresponding to the set of input features, the parameters in the hidden nodes may be adjusted based on the type of input values (e.g., input values that correspond to the set of input features) and labels that are provided to the neural network. As such, the structure of the neural network (e.g., the number of input nodes, the connections among the nodes, etc.) and the parameters associated with the different nodes in the neural network are dependent on the set of input features. Any modification to the input features (e.g., adding a new input feature, removing an input feature, etc.) would require a substantial change to the structure of the neural network. Furthermore, since the parameters of the hidden nodes are determined based on training with training data corresponding to an older set of input features, the parameters of the hidden nodes are no longer applicable for the current set of input features. A retraining of the neural network based on training data corresponding to the current set of input features is thus required. Reconfiguring and retraining machine learning models can consume both computer resources and time. Thus, conventional machine learning models are not sufficiently flexible to adapt to sudden and/or frequent changes to the input features.

However, as discussed herein, existing data sources may become unavailable, and new data sources may become available to the organization. As such, according to various embodiments of the disclosure, a computer modeling system may be provided to generate and configure machine learning models that are insensitive to changes in input feature sets. The computer modeling system may determine the data sources that are available to the organization for one or more machine learning models to perform the respective tasks. The data sources may include an internal data source that is associated with the organization and one or more external data sources (e.g., third-party data sources that are not under the control of the organization). In some embodiments, the organization may pay a subscription fee for obtaining data from the external data sources.

The computer modeling system may also determine the type of data (e.g., features) that are obtainable from each of the data sources for performing the tasks. For example, the computer modeling system may determine that features, such as past transactions conducted by the user, device attributes of devices associated with the user, past locations of the user, etc., may be obtained from the internal data source. The computer modeling system may also determine that features, such as a credit score of a merchant, a size of the merchant, an annual income of the merchant, etc. may be obtained from an external data source (e.g., Dun & Bradstreet®). The computer modeling system may also determine features, such as a hit-per-day metric for a merchant website of the merchant, a session duration metric for the merchant website, etc., may be obtained from another external data source (e.g., a web intelligence agency, etc.). The computer modeling system may also determine features, such as content that appears on different web sites, an order of different elements that appear on the different web sites, etc., may be obtained from another external data source (e.g., through an internal web scraping tool, through a web scraping company, etc.).

Instead of configuring a machine learning model to accept input values corresponding to the features of the data sources, the computer modeling system may configure the machine learning to accept input values corresponding to a set of representations of the features, where the set of representations can be generated based on features from any combination of the data sources. In some embodiments, the computer modeling system may determine the number of input features for the machine learning model (e.g., the number of representations of the features) based on the number of features associated with each of the data sources. For example, the computer modeling system may determine the number of input features as a function of the number of features associated with each of the data sources (e.g., an average number of features per data source, etc.).

The computer modeling system may then generate an encoder, for each data source, for encoding the features associated with the data source into a set of intermediate representations. The number of representations in each set of intermediate representations may be the same as the number of input features determined for the machine learning model. Thus, in the example where the organization has three data sources—an internal data source and two external data sources, the computer modeling system may generate three encoders. The three encoders may include a first encoder generated for a first data source (e.g., an internal data source), a second encoder generated for a second data source (e.g., an external data source), and a third encoder generated for a third data source (e.g., another external data source such as the web intelligence agency). While the different data sources may provide different types of data (e.g., different features) and/or different numbers of data values (e.g., different numbers of features), the three encoders are configured to encode the respective features into the same number of intermediate representations (which equals to the number of input features associated with the machine learning model). For example, the first encoder may be configured to encode a first set of features associated with the first data source into a first set of intermediate representations. The second encoder may be configured to encode a second set of features associated with the second data sources into a second set of intermediate representations. The third encoder may be configured to encode a third set of features associated with the third data sources into a third set of intermediate representations, where the first, second, and third sets of intermediate representations have the same number of representations equals to the number of input features of the machine learning model.

In some embodiments, the computer modeling system may train the encoders based on at least two objectives (e.g., using at least two loss functions). The first objective may be related to how accurate the set of intermediate representations represents the corresponding features. In this regard, the computer modeling system may generate a corresponding decoder for each encoder generated for a data source. For example, the computer modeling system may generate a first decoder configured to expand the first set of intermediate representations back to the first set of features. The computer modeling system may also generate a second decoder configured to expand the second set of intermediate representations back to the second set of features. The computer modeling system may also generate a third decoder configured to expand the third set of intermediate representations back to the third set of features. In some embodiments, the first, second, and third decoders include a reverse structure of their corresponding encoders such that the decoder reverses the actions performed by the corresponding encoders. To accomplish the first objective, the computer modeling system may train each of the first, second, and third encoders (and the corresponding first, second, and third decoders) to minimize the differences between the input values of the encoder and the output values of the corresponding decoder.

The second objective may be related to minimizing the variance among the different sets of intermediate representations generated by the encoders. Thus, the computer modeling system may train the different encoders together (as a whole). For example, the computer modeling system may obtain a set of training data corresponding to the first, second, and third sets of features. The computer modeling system may provide the respective portions of the training data to the different encoders and may train the encoders together to minimize the output variance among the three encoders. This way, each of the encoders is trained to not only accurately represent the corresponding set of features from the corresponding data source, but also trained to accurately represent features from the other data sources. For example, due to the invariance of the outputs (e.g., the sets of intermediate representations) of the encoders, the outputs of one encoder (e.g., the first encoder) can be fed into a different decoder (e.g., the second decoder) to accurately derive the second set of features associated with the second data source. As a result, the outputs of the encoders as a whole are generated to be insensitive to the availability of any one of the data sources (internal and/or external data sources).

In some embodiments, the computer modeling system may determine a set of representations for the features of the different data sources based on the different sets of intermediate representations. For example, the computer modeling system may determine the set of representations by performing a function (e.g., an average, a median, a sum, etc.) on the sets of intermediate representations. Since the sets of intermediate representations should have little variance, the set of representations should be similar to any one of the sets of intermediate representations. The computer modeling system may then use the set of representations as input features for the machine learning model for performing the task.

By using the set of representations, as generated using the techniques disclosed herein, as input features for the machine learning model, the machine learning model is no longer sensitive to the modifications of input features corresponding to the data sources. For example, removing and/or adding a data source no longer requires a reconfiguration and retraining of the machine learning model, as the input features associated with the machine learning model are not directly affected by the features from any one individual data source. When a data source (e.g., the second data source) becomes unavailable, the computer modeling system may remove the corresponding encoder (e.g., the second encoder) from consideration for generating the set of representations. Thus, when calculating the set of representations for the machine learning model, the computer modeling system may perform the calculation on the first and third sets of intermediate representations, and not the second set of intermediate representations which has become unavailable. This way, the operations of the machine learning model are unaffected even when features associated with a data source become unavailable, as the input features (e.g., the set of representations) may still be generated for the machine learning model without the second encoder.

When a new data source (e.g., a fourth data source) that is relevant to performing the task becomes available to the organization, the computer modeling system may generate a new encoder (e.g., a fourth encoder) for the fourth data source. The computer modeling system may configure and train the fourth encoder in a similar manner as configuring and training the other encoders as discussed herein. For example, the computer modeling system may configure the fourth encoder to encode a fourth set of features associated with the fourth data source into a fourth set of intermediate representations. The computer modeling system may also train the fourth encoder based on the two objectives—(1) to generate the fourth set of intermediate representations that accurately represents the fourth set of features and (2) to minimize the variance between the fourth set of intermediate representations and the other sets of intermediate representations (e.g., the first, second, and third sets of intermediate representations). In some embodiments, the computer modeling system may add the fourth set of intermediate representations in the calculation of the set of representations (e.g., the input features for the machine learning model), such that the fourth set of intermediate representations are also represented in the set of representations. This way, the operations of the machine learning model are unaffected when new features associated with a new data source become available, as the input features (e.g., the set of representations) may still be generated for the machine learning model even with the addition of the fourth data source (with the addition of the fourth encoder).

FIG. 1 illustrates an electronic transaction system 100, within which the computer modeling system may be implemented according to one embodiment of the disclosure. The electronic transaction system 100 includes a service provider server 130, a merchant server 120, a user device 110, and servers 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to add a new funding account, to perform an electronic purchase with a merchant associated with the merchant server 120, to provide information associated with the new funding account, to initiate an electronic payment transaction with the service provider server 130, to apply for a financial product through the service provider server 130, to access data associated with the service provider server 130, etc.).

While only one user device 110 is shown in FIG. 1, it has been contemplated that multiple user devices, each associated with a different user, may be connected to the merchant server 120 and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the electronic transactions (e.g., electronic payment transactions, data access transactions, etc.) among users and merchants offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an accounts database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a transaction processing module 132 that implements the computer modeling system as discussed herein. The transaction processing module 132 may be configured to process transaction requests received from the user device 110 and/or the merchant server 120 via the interface server 134. In some embodiments, depending on the type of transaction requests received via the interface server 134, the transaction processing module 132 may use different machine learning models to perform different tasks associated with the transaction request. For example, the transaction processing module 132 may use various machine learning models to analyze different aspects of the transaction request (e.g., a fraudulent transaction risk, a chargeback risk, a recommendation based on the request, etc.). The machine learning models may produce outputs that indicate a risk (e.g., a fraudulent transaction risk, a chargeback risk, a credit risk, etc.) or indicate an identity of a product or service to be recommended to a user. The transaction processing module 132 may then perform an action for the transaction request based on the outputs. For example, the transaction processing module 132 may determine to authorize the transaction request (e.g., by using the service applications 138 to process a payment transaction, etc.) when the risk is below a threshold, and may deny the transaction request when the risk is above the threshold.

In some embodiments, to perform the various tasks associated with the transaction request (e.g., assess a fraudulent risk of the transaction request, assessing a chargeback risk, generating a recommendation, etc.), the machine learning models may use attributes related to the transaction request, the user who initiated the request, the user account through which the transaction request is initiated, a merchant associated with the request, and other attributes during the evaluation process to produce the outputs. In some embodiments, the transaction processing module 132 may obtain the attributes for processing the transaction requests from different sources. For example, the transaction processing module 132 may obtain, from an internal data sources (e.g., the accounts database 136, the interface server 134, etc.), attributes such as device attributes of the user device 110 (e.g., a device identifier, a network address, a location of the user device 110, etc.), attributes of the user 140 (e.g., a transaction history of the user 140, a demographic of the user 140, an income level of the user 140, a risk profile of the user 140, etc.), attributes of the transaction (e.g., an amount of the transaction, etc.). The transaction processing module 132 may also obtain other attributes from one or more external data sources (e.g., servers 180 and 190).

Each of the servers 180 and 190 may be associated with a data analytics organization (e.g., a company analytics organization, a web analytics organization, etc.) configured to provide data associated with different companies and/or websites. The servers 180 and 190 may be third-party servers that are not affiliated with the service provider server 130. In some embodiments, the service provider associated with the service provider server may enter into an agreement (e.g., by paying a fee, etc.) with the data analytics organizations to obtain data from the servers 180 and 190. As such, the transaction processing module 132 may obtain additional attributes related to the transaction request from the servers 180 and 190 for processing the transaction request. For example, the transaction processing module 132 may obtain, from the server 180, attributes such as a credit score of the merchant associated with the transaction request, a size of the merchant, an annual income of the merchant, etc. The transaction processing module 132 may also obtain, from the server 190, attributes such as a hit-per-day metric for a merchant website of the merchant, a session duration metric for the merchant website, etc.

Upon obtaining the attributes from the internal data source and the external data sources, the transaction processing module 132 may use one or more machine learning models to perform tasks related to the processing of the transaction request based on the attributes. For example, the transaction processing module 132 may use a machine learning model to determine a fraudulent transaction risk associated with the transaction request based on the obtained attributes. The transaction processing module 132 may also use another machine learning model to determine a chargeback risk associated with the transaction request based on the obtained attributes. The transaction processing module 132 may also use yet another machine learning model to determine a recommendation (e.g., a product or service recommendation) for the user 140 based on the obtained attributes. The transaction processing module 132 may process the transaction request based on the outputs from the machine learning models. For example, the transaction processing module 132 may authorize the transaction request when the fraudulent transaction risk and the chargeback risk are below a threshold but may deny the transaction request when either of the fraudulent transaction risk or the chargeback risk is above the threshold. The transaction processing module 132 may also present a product or service recommendation as the transaction request is processed.

Conventionally, the transaction processing module 132 may configure the machine learning models to accept the obtained attributes as input features to generate the outputs. However, as discussed herein, a machine learning model that is configured in this manner may become inflexible with respect to modifications to the input features. For example, any modification to the input features (e.g., removing an input feature, adding an input feature, etc.) would require reconfiguring and retraining the machine learning model. Thus, the transaction processing module 132 may generate and configure machine learning models that are insensitive to modifications of input features for performing the tasks according to various embodiments of the disclosure.

Figure 2:
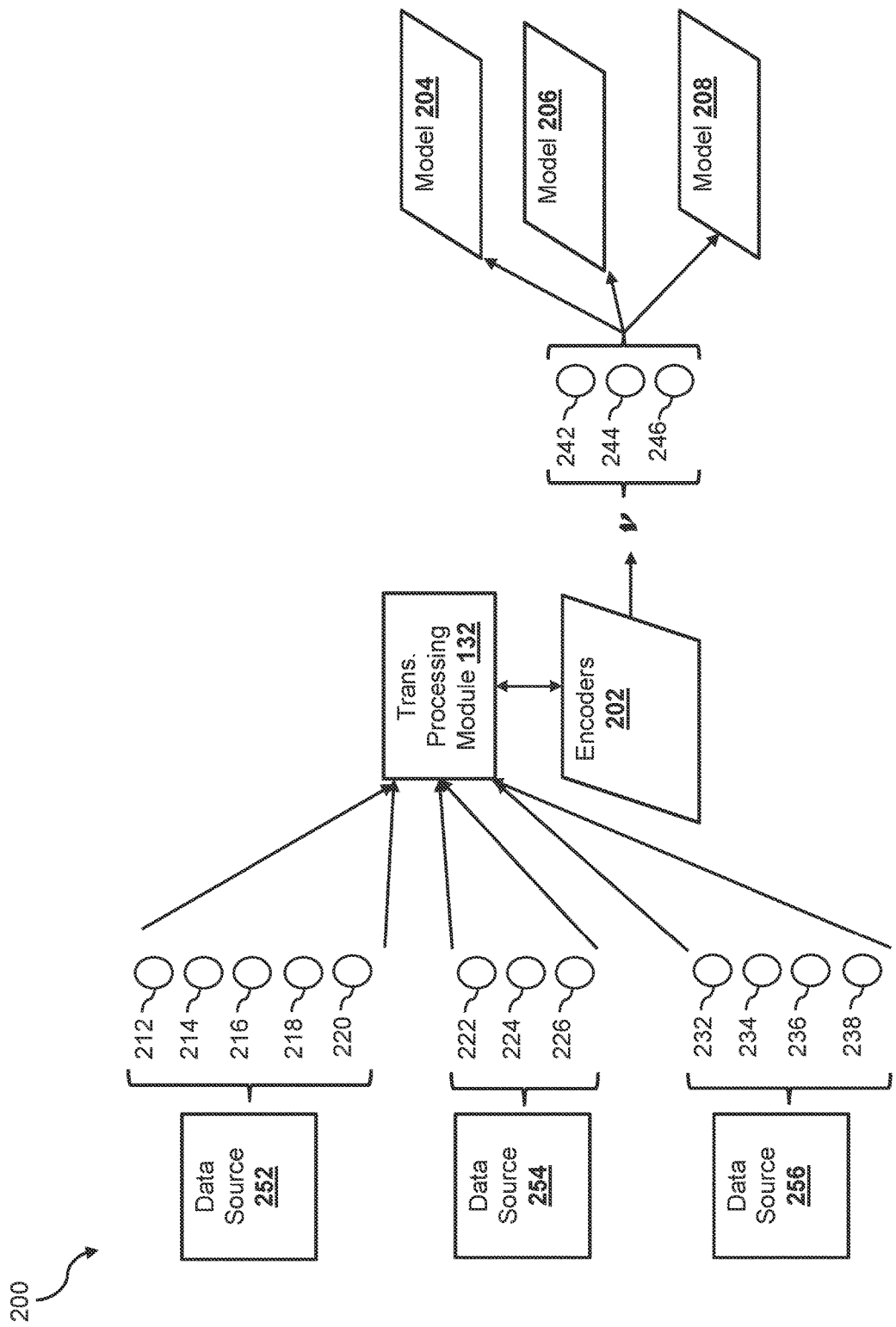
FIG. 2 illustrates an example framework for configuring machine learning models that are insensitive to changes to input features according to an embodiment of the present disclosure.

FIG. 2 illustrates a framework 200 usable by the transaction processing module 132 to generate and configure machine learning models that are insensitive to modifications to input features according to various embodiments of the disclosure. As shown in FIG. 2, the transaction processing module 132 may be communicatively coupled to the data sources (e.g., data sources 252, 254, and 256) from which the transaction processing module 132 can obtain attributes for processing transaction requests. In this example, the data sources may include an internal data source (e.g., the data source 252), which may correspond to the accounts database 136 and/or the interface server 134. The data sources may also include external data sources (e.g., the data sources 254 and 256), which may correspond to the servers 180 and 190. The transaction processing module 132 may determine features (e.g., types of attributes) that are obtainable from each of the data sources 252, 254, and 256 for performing the tasks. For example, the transaction processing module 132 may determine that features 212, 214, 216, 218, and 220 are obtainable from the data source 252. The features 212, 214, 216, 218, and 220 may include attributes of users who initiate transaction requests, such as an age of the user, a job title of the user, an income level of the user, transaction history of the user, etc. The transaction processing module 132 may also determine that features 222, 224, and 226 are obtainable from the data source 254. The features 222, 224, and 226 may include attributes of merchants that are involved in the transaction requests, such as a credit score of a merchant, an annual revenue of the merchant, an insolvency status of the merchant, etc. The transaction processing module 132 may also determine that features 232, 234, 236, and 238 are obtainable from the data source 256. The features 232, 234, 236, and 238 may include attributes of merchant websites of merchants that are involved in the transaction requests, such as hit-per-day metric for the merchant website, an average session duration for the merchant website, a hit distribution over different times of day for the merchant website, etc.

In some embodiments, the transaction processing module 132 may generate and configure different machine learning models (e.g., models 204, 206, and 208) to perform tasks that are related to processing the transaction requests. For example, the transaction processing module 132 may generate the model 204 for determining a fraudulent transaction risk of a transaction, may generate the model 206 for determining a chargeback risk of a transaction, and may generate the model 208 for determining a recommendation based on a transaction. Each of the models 204, 206, and 208 may be implemented as a machine learning model, such as an artificial neural network, a regression model, a gradient-boosting tree, etc. Furthermore, the models 204, 206, and 208 may be implemented using different machine learning model structures under the framework 200. For example, the model 204 may be implemented as an artificial neural network while the model 206 may be implemented as a gradient-boosting tree.

In some embodiments, instead of configuring each of the models 204, 206, and 208 to use the features 212, 214, 216, 218, 220, 222, 224, 226, 232, 234, 236, and 238 corresponding to the different data sources 252, 254, and 256 as input features for the models, the transaction processing module 132 may configure each of the models 204, 206, and 208 to use a set of representations (e.g., representations 252, 254, and 256) as input features. In some embodiments, the transaction processing module 132 may first determine a number of representations to be used as input features for the models 204, 206, 208. The number of representations may be determined based on different factors, such as a total number of features obtainable from the data sources 252, 254, and 256, a number of features obtainable from each of the data sources 252, 254, and 256, a maximum number and a minimum number of features obtainable from each of the data sources 252, 254, and 256, a total number of data sources, and other factors. For example, the transaction processing module 132 may determine the number of representations as a percentage (e.g., 40%, 60%, etc.) of the total number of features. In this example, the transaction processing module 132 may determine three representations 252, 254, and 256 for representing the features 212, 214, 216, 218, 220, 222, 224, 226, 232, 234, 236, and 238 from the data sources 252, 254, and 256.

In some embodiments, the representations 242, 244, and 246 may be generated based on encoding the features 212,

214, 216, 218, 220, 222, 224, 226, 232, 234, 236, and 238 using one or more encoders 202. The transaction processing module 132 may configure the encoders 202 to generate the representations 242, 244, and 246 to accurate representing the features 212, 214, 216, 218, 220, 222, 224, 226, 232, 234, 236, and 238. By using the representations 242, 244, and 246, instead of the actual features 212, 214, 216, 218, 220, 222, 224, 226, 232, 234, 236, and 238, as input features for the models 204, 206, and 208, the models 204, and 206, and 208 may be insensitive to changes to the features 212, 214, 216, 218, 220, 222, 224, 226, 232, 234, 236, and 238. For example, each of the models 204, 206, and 208 may remain operable to perform the respective tasks even when features from one or more of the data sources become unavailable.

Figure 3:
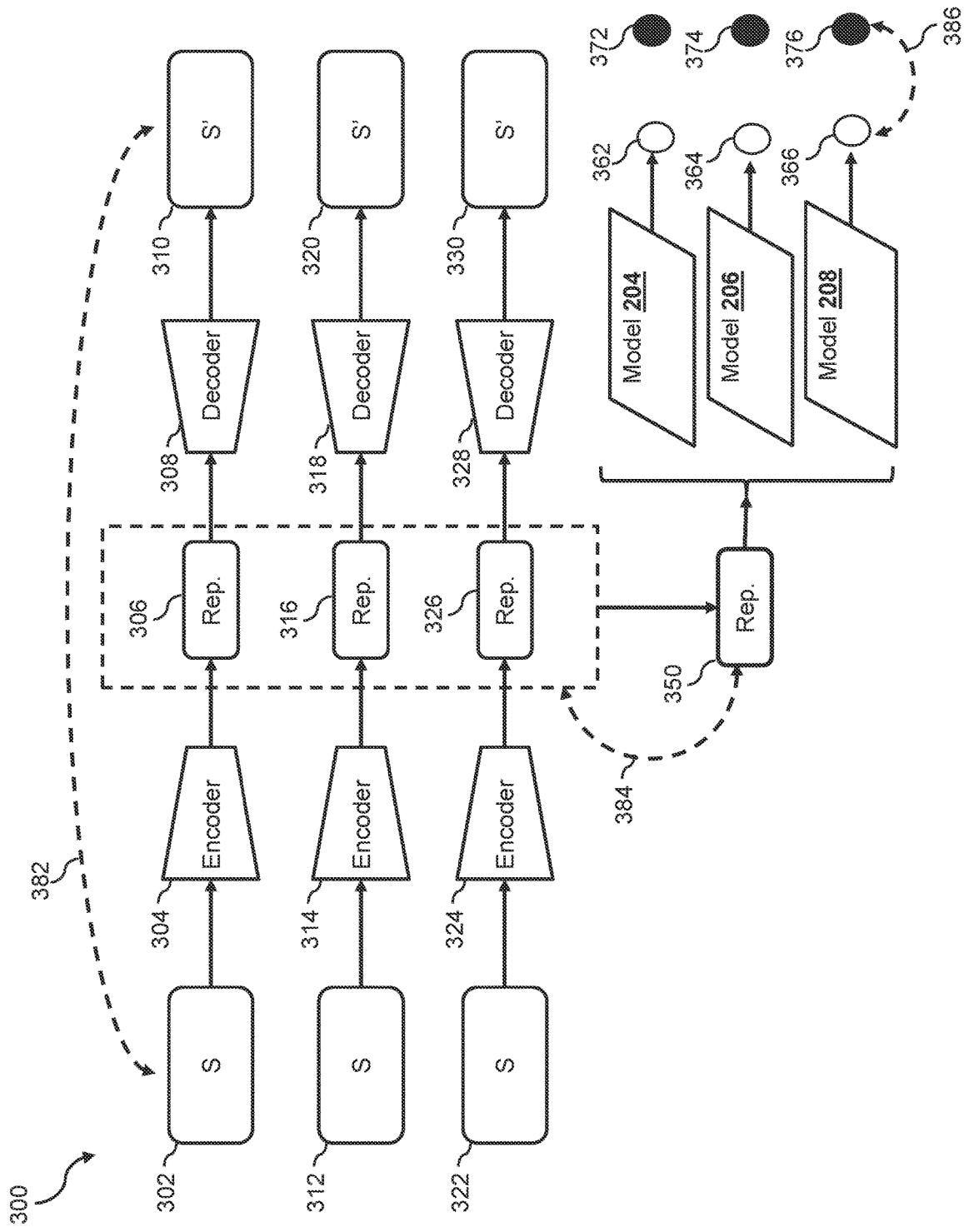
FIG. 3 illustrates example encoders used to generate input values for a machine learning model according to an embodiment of the present disclosure.

FIG. 3 illustrates an encoder framework 300 usable by the transaction processing module 132 to encode features into a set of representations according to various embodiments of the disclosure. In some embodiments, the transaction processing module 132 may place the features 212, 214, 216, 218, 220, 222, 224, 226, 232, 234, 236, and 238 into different groups based on one or more criteria. For example, the transaction processing module 132 may group the features 212, 214, 216, 218, 220, 222, 224, 226, 232, 234, 236, and 238 based on their corresponding data sources. As such, the transaction processing module 132 may place the features 212, 214, 216, 218, and 220 in a first group, may place the features 222, 224, and 226 in a second group, and may place the features 232, 234, 236, and 238 in a third group. In some embodiments, the transaction processing module 132 may group the features according to different criteria (e.g., based on geographical locations of the servers associated with the data sources from which the attributes are obtained, categories of the attributes, etc.).

The transaction processing module 132 may then generate an encoder for each group of features. In the example where the transaction processing module 132 groups the features according to their data sources, the transaction processing module 132 may generate three encoders 304, 314, and 324—each for a corresponding data source. Each of the encoders 304, 314, and 324 may be implemented as a machine learning model (e.g., a deep-learning encoder model), and configured to encode a respective set of features into a set of intermediate representations of the set of features. For example, the transaction processing module 132 may configure the encoder 304 to receive a set of features 302, which may correspond to the features 212, 214, 216, 218, and 220 of the data source 252, and encode it into a set of intermediate representations 306. Similarly, the transaction processing module 132 may configure the encoder 316 to receive a set of features 312, which may correspond to the features 222, 224, and 226 of the data source 254, and encode it into a set of intermediate representations 316. The transaction processing module 132 may also configure the encoder 324 to receive a set of features 322, which may correspond to the features 232, 234, 236 and 238 of the data source 256, and encode it into a set of intermediate representations 326. In some embodiments, each of the encoders 306, 316, and 326 are configured to encode the respective features into the same number of intermediate representations (corresponding to the number of representations 242, 244, and 246), such that the set of intermediate representations 306, the set of intermediate representations 316, and the set of intermediate representations 326 all include the same number of values (e.g., 3 values in this example).

The transaction processing module 132 may train the encoders 304, 314, and 324 based on at least two objectives (e.g., two loss (optimization) functions). The first objective may be related to how accurate the set of intermediate representations represents the corresponding features. In this regard, the transaction processing module 132 may generate a corresponding decoder for each encoder generated for a group of features. For example, the transaction processing module 132 may generate a decoder 308 corresponding to the encoder 304. The decoder 308 may be configured to expand the set of intermediate representations 306, generated by the encoder 304, to a set of features 310. The transaction processing module 132 may also generate a decoder 318 corresponding to the encoder 314. The decoder 318 may be configured to expand the set of intermediate representations 316, generated by the encoder 314, to a set of features 320. The transaction processing module 132 may also generate a decoder 328 corresponding to the encoder 324. The decoder 328 may be configured to expand the set of intermediate representations 326, generated by the encoder 324, to a set of features 330. In some embodiments, the decoders 308, 318, and 328 may include a reverse structure of their corresponding encoders 304, 314, and 324, such that the decoder reverses the actions performed by the corresponding encoders. In one scenario where the encoders 304, 314, and 324 generates the sets of intermediate representations 306, 316, and 326 to accurately represent the sets of features 302, 312, and 322, the decoders 308, 318, and 328 should be able to re-generate the sets of features 302, 312, and 322 such that the sets of features 310, 320, and 330 are identical to the set of features 302, 312, and 322, respectively.

To accomplish the first objective, the transaction processing module 132 may use a loss function 382 that is defined as a difference between the sets of features 302, 312, and 322 (inputs to the encoders 304, 314, and 324, respectively) and the sets of features 310, 320, and 330 (outputs of the decoders 308, 318, and 328, respectively). The transaction processing module 132 may train the encoders 304, 314, and 324 using the loss function 382 to minimize the differences between the inputs to the encoders 304, 314, and 324 (e.g., the sets of features 302, 312, and 322) and the outputs of the decoders 308, 318, and 328 (e.g., the sets of features 310, 320, and 330). By minimizing the differences between the inputs to the encoders 304, 314, and 324 and the outputs of the decoders 308, 318, and 328, the transaction processing module 132 ensures that the intermediate representations 306, 316, and 326 accurately represent the set of features 302, 312, and 322.

The second objective may be related to minimizing a variance among the different sets of intermediate representations 306, 316, and 326 generated by the encoders 304, 314, and 316. Thus, the transaction processing module 132 may train the different encoders 304, 314, and 324 (and the corresponding decoders 308, 318, and 328) together (e.g., as a whole) using a loss function 384. The loss function 382 may be defined as the difference between the set of intermediate representations 306, the set of intermediate representation 316, and the set of intermediate representations 326. Alternatively, the loss function 382 may be defined as the difference between each set of intermediate representation and the set of representation 350. By training the encoders 304, 314, and 324 (and the corresponding decoders 308, 318, and 328) using the loss function 384, the transaction processing module 132 minimizes the variance among the generated representations 306, 316, and 326. For example, after training the encoders 304, 314, and 324 using the loss function 384, when the transaction processing module 132 provides attributes associated with a transaction request and corresponding to the sets of features 302, 312, and 322 obtained from the different data sources 352, 354, and 356 to the encoders 304, 314, and 324, the encoders 304, 314, and 324 may be configured to generate the sets of intermediate representations 306, 316, and 326, where the sets of intermediate representations 306, 316, and 326 are within a predetermined threshold of each other.

In some embodiments, the transaction processing module 132 may train the encoders 304, 314, and 324 using a combination of the loss function 382 and the loss function 384, such that the encoders 304, 314, and 324 are trained to minimize (i) differences between the inputs of the encoders 304, 314, and 324 and the outputs of the decoders 310, 320, and 330 and (ii) differences among the intermediate representations 306, 316, and 326. In some embodiments, the transaction processing module 132 may determine different weights for the different loss functions 382 and 384. By assigning different weights to the loss functions 382 and 384, the transaction processing module may train the encoders 304, 314, and 324 based on either an emphasis on the first objective or the second objective.

By training the encoders 304, 314, and 324 using a combination of the loss functions 382 and 384, each of the encoders 304, 314, and 324 may be trained to not only accurately represent the corresponding set of features from the corresponding data source, but also trained to accurately represent features from the other data sources. For example, due to the invariance of the outputs (e.g., the sets of intermediate representations 306, 316, and 326) of the encoders 304, 314, and 324, the outputs of the encoders 304, 3145, and 324 are relatively interchangeable. Thus, the outputs of one encoder (e.g., the encoder 304) can be fed into a different decoder (e.g., the decoder 318) to accurately derive the set of features 320 associated with the data source 254. As a result, the outputs of the encoders 304, 314, and 324 as a whole are generated to be insensitive to the availability of any one of the data sources.

In some embodiments, the transaction processing module 132 may determine a set of representations 350 (which may include the representations 242, 244, and 246) for the features 212, 214, 216, 218, 220, 222, 224, 226, 232, 234, 236, and 238 of the different data sources 252, 254, and 256 for use as input features for the models 204, 206, and 208. The transaction processing module 132 may determine the set of representations 350 based on the different sets of intermediate representations 306, 316, and 326. For example, the transaction processing module 132 may determine the set of representations 350 by performing a function (e.g., an average, a median, a sum, etc.) based on the sets of intermediate representations 306, 316, and 326. Since the sets of intermediate representations 306, 316, and 326 should have little variance based on the training using the loss function 384, the set of representations 350 should be similar to (e.g., within a threshold of) any one of the sets of intermediate representations 306, 316, and 326. The computer modeling system may then use the set of representations 350 as input features for the models 204, 206, and 208 for performing the respective tasks.

Each of the models 204, 206, and 208 may be configured to use the set of representations 350 to produce a respective output. For example, the model 204 may be configured to produce an output 362 (e.g., a risk score) indicating a fraudulent transaction risk of a transaction request based on the set of representations 350 associated with the transaction request. The model 206 may be configured to produce an output 364 (e.g., a risk score) indicating a chargeback risk of a transaction request based on the set of representations 350 associated with the transaction request. The model 208 may be configured to produce an output 366 (e.g., a product identifier) indicating a product recommendation based on the set of representations 350 associated with the transaction request. In some embodiments, each of the models 204, 206, and 208 may be trained using training data sets that include labels 372. For example, the transaction processing module 132 may train the model 204 using training data sets, wherein each training data set corresponds to a past transaction and may include attributes (corresponding to the features 212, 214, 216, 218, 220, 222, 224, 226, 232, 234, 236, and 238) and a label 372 indicating an actual risk of the past transaction. The model 204 may be trained using a loss function 386 that is defined as a difference between the output 362 of the model 204 and the label 372. By training the model 204 to minimize the difference, the model 204 may be trained to produce outputs 362 that are similar to the labels 372. In some embodiments, the transaction processing module 132 may train the other models 206 and 208 similarly, using training data sets that include labels 374 and 376. The transaction processing module 132 may also train the models 206 and 208 using the loss function 386 to minimize the differences between the outputs of the models 206 and 208 (e.g., outputs 364 and 366) and the labels 374 and 376.

In some embodiments, the transaction processing module 132 may also use the loss function 386 for training the encoders 304, 314, and 324. For example, in addition to using the loss functions 382 and 384, the transaction processing module 132 may use a combination of the loss functions 382, 384, and 386 in training the encoders 304, 314, and 324, such that, (i) the intermediate representations 306, 316, and 326 accurately represent the corresponding features 302, 312, and 322, (ii) the variance among the intermediate representations 306, 316, and 326 is minimized, and (iii) the intermediate representations 306, 316, and 326 are generated to enable the models 204, 206, and 208 to provide accurate predictions (to perform the respective tasks accurately). The transaction processing module 132 may also assign different weights to the loss functions 382, 384, and 386 such that the encoders 304, 314, and 324 are trained with different emphases on the loss functions 382, 384, and 386.

By using the set of representations 350, as generated using the techniques disclosed herein, as input features for the models 204, 206, and 208, the models 204, 206, and 208 are no longer as sensitive to the modifications of input features corresponding to the data sources 252, 254, and 256 as conventional machine learning models that are configured to use the features 212, 214, 216, 218, 220, 222, 224, 226, 232, 234, 236, and 238 directly as input features for the models 204, 206, and 208. For example, removing and/or adding a group of features (e.g., removing and/or adding a data source) no longer requires reconfiguring and retraining the models 204, 206, and 208, as the input features (e.g., the representations 350) associated with the models 204, 206, and 208 are not directly affected by the features from any one individual data source.

Figure 4:
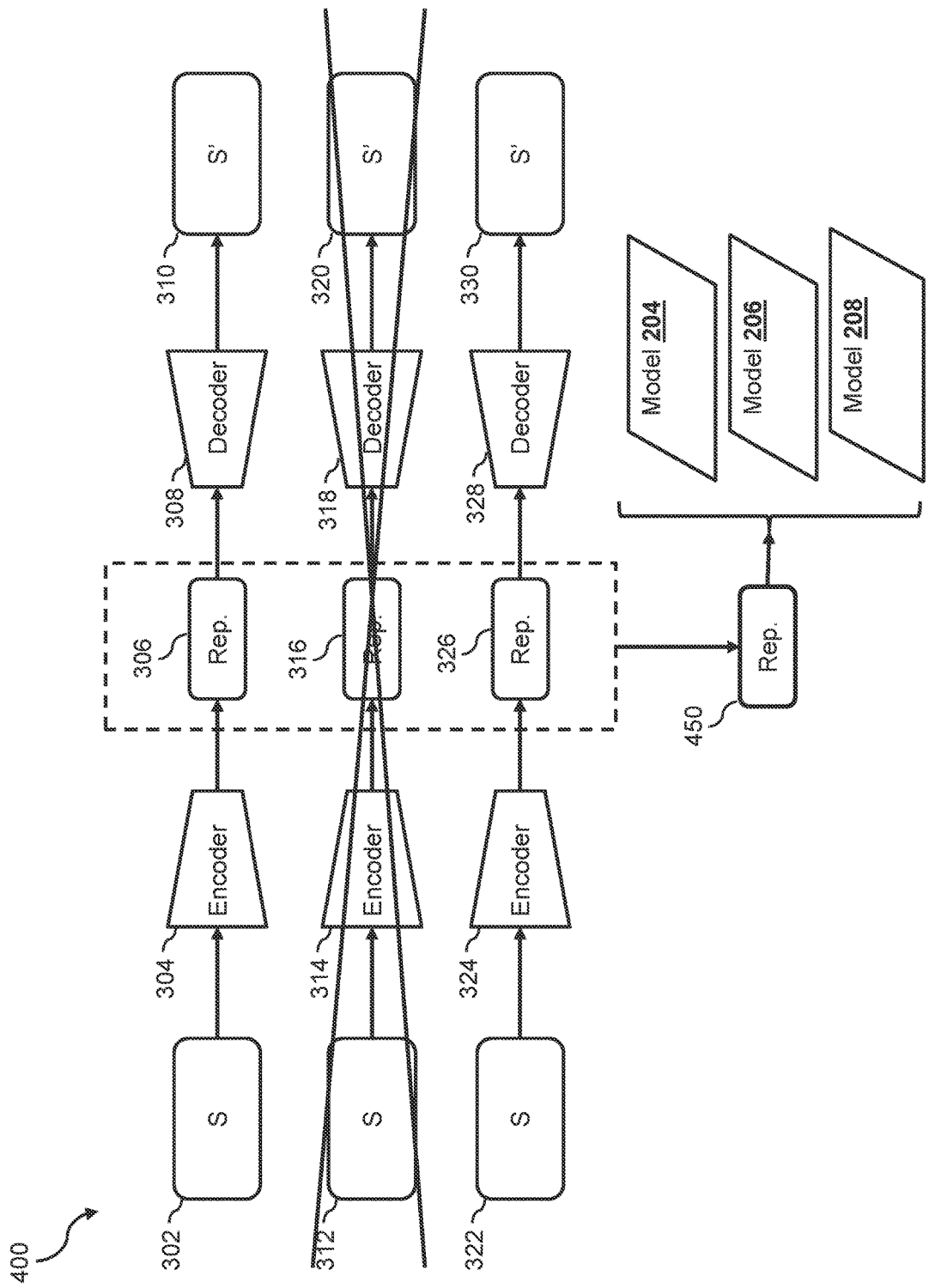
FIG. 4 illustrates a removal of a data source within the framework according to an embodiment of the present disclosure.

When a data source (e.g., the data source 254) becomes unavailable, the computer modeling system may remove the corresponding encoder (e.g., the encoder 312) from consideration for generating the set of representations 350. FIG. 4 illustrates an encoder framework 400 to accommodate the unavailability of one of the data sources according to various embodiments of the disclosure. In the example illustrated in FIG. 4, it is determined that data from the data source 254 has become unavailable to the transaction processing module 132. As discussed herein, data from a data source may become unavailable for a variety of reasons. For example, the data source 254 may become unavailable when the data source 254 terminates its operations or experiences technical difficulties (e.g., server is down or has gone offline, etc.). The service provider associated with the service provider server 130 may decide to terminate a relationship with the data source 254 based on a business decision (e.g., cost-related reasons, data from the data source 254 not insightful enough, etc.). When substantial efforts are required (which corresponds to substantial costs) to modify input features associated with machine learning models, an organization, such as the service provider, may resist from terminating the relationship with a data source even when the cost for obtaining data from that data source is not justifiable based on the results. Configuring machine learning models to be insensitive to modifications to input features using the techniques disclosed herein enables the service provider to make the decision regarding terminating any data sources without taking the substantial cost of reconfiguring and retraining the machine learning models into consideration.

As shown in FIG. 4, after determining that the data source 254 (or a particular group of features) has become unavailable, the transaction processing module 132 may remove the corresponding encoder (e.g., the encoder 314) from being used to calculate the set of representations 450 for the models 204, 206, and 208. When the transaction processing module 132 processes another transaction request, the transaction processing module 132 may obtain only attributes corresponding to the features 212, 214, 216, 218, and 220 from the data source 254 and attributes corresponding to the features 232, 234, 236, and 238 from the data source 256, and not any attributes from the data source 254. The transaction processing module 132 may provide the attributes corresponding to the features 212, 214, 216, 218, and 220 to the encoder 304 to generate a set of intermediate representations 306. The transaction processing module 132 may also provide the attributes corresponding to the features 232, 234, 236, and 238 to the encoder 324 to generate a set of intermediate representations 326. The transaction processing module 132 may generate the set of representations 450 based only on the set of intermediate representations 306 and the set of intermediate representations 326, and then provide the set of representations 450 to the models 204, 206, and 208 as input values for processing the transaction request. This way, the operations of the models 204, 206, and 208 are unaffected even when features associated with the data source 254 become unavailable, as the input features (e.g., the set of representations 450) may still be generated for the models 204, 206, and 208 without the features 222, 224, and 226 from the data source 254.

Figure 5:
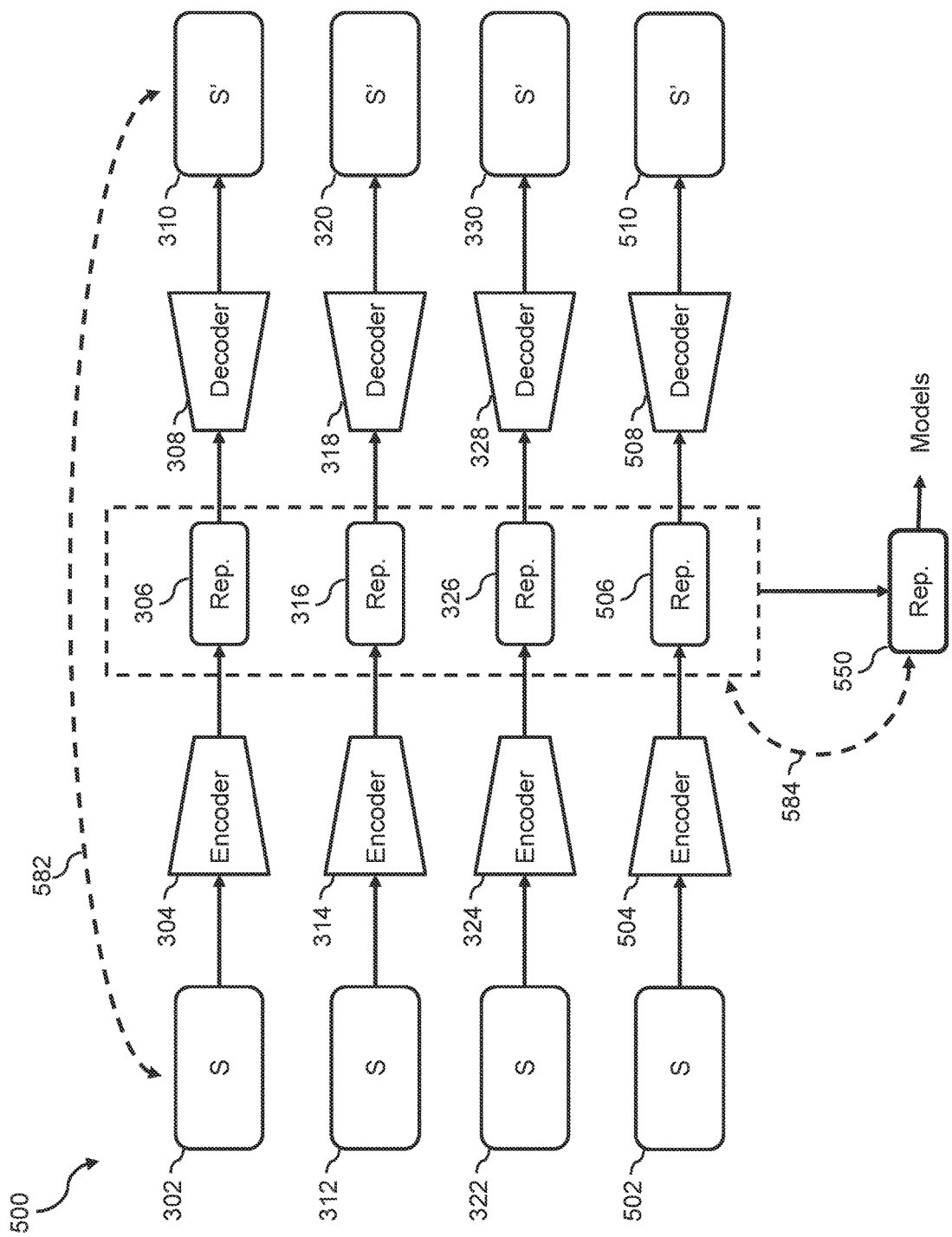
FIG. 5 illustrates an addition of a data source within the framework according to an embodiment of the present disclosure.

When attributes from a new data source that is relevant to performing the tasks associated with the models 204, 206, and 208 becomes available to the transaction processing module 132, the transaction processing module 132 may generate a new encoder for the new data source. The transaction processing system 132 may integrate the new encoder into the encoder framework for generating the set of representations for the downstream models. FIG. 5 illustrates an encoder framework 500 to accommodate the availability of a new data source according to various embodiments of the disclosure. As shown in FIG. 5, the transaction processing module 132 generates an encoder 504 and a corresponding decoder 508 for the new data source. The encoder 504 may be configured to receive attributes corresponding to a set of features 502 from the new data source and encode the attributes into a set of intermediate representations 506. The decoder 508 may be configured to expand the set of intermediate representations 506 to a set of features 510.

In some embodiments, the transaction processing module 132 may train the encoder 504 (and the corresponding decoder 508) in a similar manner as configuring and training the other encoders 304, 314, and 324 discussed herein. Specifically, the computer modeling system may train the encoder 504 (and the corresponding decoder 508) based on a combination of at least two loss functions 582 and 584. The loss function 582 may be defined by a difference between the inputs for the encoder 504 (e.g., the set of features 502) and the outputs of the decoder 508 (e.g., the set of features 510). By training the encoder 504 and the corresponding decoder 508 using the loss function 582, the encoder 504 may be trained to produce the set of intermediate representations 506 that accurately represents the inputs (e.g., the set of features 502). The loss function 584 may be defined as a difference between the set of intermediate representations 506 and other sets of intermediate representations 306, 316, and 326. Alternatively, the loss function 584 may be defined as a difference between the set of intermediate representations 506 and the set of representations 550 (generated by performing a calculation based on the sets of intermediate representations 306, 316, 326, and 506). Either way, training the encoder 504 using the loss function 584 minimizes the variance between the set of intermediate representations 506 and other sets of intermediate representations 306, 316, and 326. In some embodiments, the transaction processing module 132 may also train the encoder 504 using another loss function similar to the loss function 386, which is defined by a difference between the outputs of the models 204, 206, and 208 and the corresponding labels associated with the training data.

After training the encoder 504 and the corresponding decoder 508, when the transaction processing module 132 receives a transaction request, the transaction processing module 132 may obtain attributes that are associated with a transaction request from the data sources 252, 254, 256, and the new data source. The transaction processing module 132 may use the encoder 504, along with other encoders 304, 314, and 324, to encode attributes received from the data sources 252, 254, 256 and the new data source into the sets of intermediate representations 306, 316, 326, and 506. The transaction processing module 132 may generate the set of representations 550 based on the sets of intermediate representations 306, 316, 326, and 506 (e.g., calculate an average based on the sets of intermediate representations), and may provide the set of representations 550 to the models 204, 206, and 208 to evaluate different aspects of the transaction request. Using the encoder framework 500, adding new features for evaluating transaction requests no longer requires reconfiguring and retraining the models 204, 206, and 208, as their operations are unaffected by the addition of the features and/or data sources.

Figure 6:
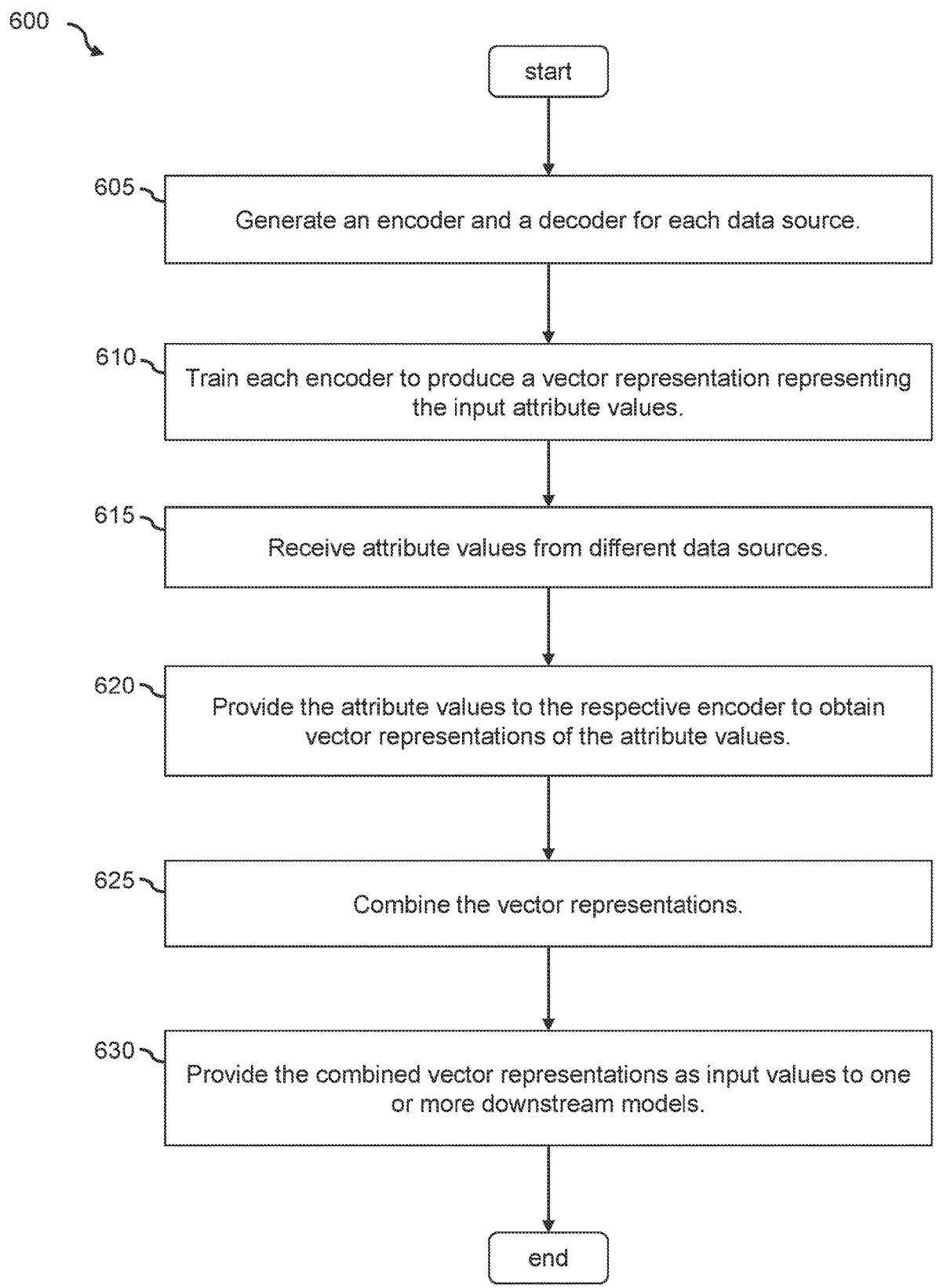
FIG. 6 is a flowchart showing a process of configuring a machine learning model to be insensitive to changes to input features according to an embodiment of the present disclosure.

FIG. 6 illustrates a process 600 for generating and configuring machine learning models that are insensitive to modifications to input features according to various embodiments of the disclosure. In some embodiments, at least a portion of the process 600 may be performed by the transaction processing module 132. The process 600 begins by generating (at step 605) an encoder and a decoder for each data source. For example, the transaction processing module 132 may determine the number of data sources from which attributes can be obtained. In one example, the transaction processing module 132 may determine that attributes associated with transaction requests can be obtained from the data sources 252, 254, and 256. Thus, the transaction processing module 132 may generate three encoders and corresponding decoders. The transaction processing module 132 may generate an encoder 304 for encoding attributes obtained from the data source 252, may generation an encoder 314 for encoding attributes obtained from the data source 254, and may generate an encoder 324 for encoding attributes obtained from the data source 256. Each of the encoders 304, 314, and 324 may be configured to encode attributes obtained from the corresponding data sources into a set of intermediate representations of the attributes (e.g., the sets of intermediate representations 306, 316, and 326).

The process 600 then trains (at step 610) each encoder to produce a vector representation representing the input attribute values. For example, the transaction processing module 132 may train each of the encoders 304, 314, and 324 using at least two loss functions, wherein the first loss function is defined by a difference between inputs of an encoder and outputs of a corresponding decoder, and wherein the second loss function is defined by a difference between a set of intermediate representations and other set(s) of intermediate representations.

The process 600 receives (at step 615) attribute values from different data sources and provides (at step 620) the attribute values to the respective encoder to obtain vector representations of the attribute values. For example, when the transaction processing module 132 receives a request to process a transaction request, the transaction processing module 132 may retrieve attributes associated with the transaction request from the different data sources 252, 254, and 256. The transaction processing module 132 may then provide portions of the attributes to the corresponding encoders 304, 314, and 316. The encoders 304, 314, 316 may be configured to encode the respective portions of the attributes to different sets of intermediate representations (e.g., the sets of intermediate representations 306, 316, and 326).

The process 600 then combines (at step 625) the vector representations and provides (at step 630) the combined vector representations as input values to one or more downstream models. For example, the transaction processing module 132 may generate the set of representations 350 based on combining the sets of intermediate representations 306, 316, and 326. In some embodiments, the transaction processing module 132 may generate the set of representations 350 by calculating an average among the sets of intermediate representations 306, 316, and 326. The transaction processing module 132 may then provide the set of representations 350 to the models 204, 206, and 208. Each of the models 204, 206, and 208 may be configured to use the set of representations 350 to determine an output for the transaction request. The output may indicate a risk (e.g., a fraudulent transaction risk, a chargeback risk, etc.), a recommendation (e.g., a product recommendation, a service recommendation, etc.) or other aspects related to the transaction request. The transaction processing module 132 may then process the transaction request based on the outputs of the models 204, 206, and 208.

Figure 7:
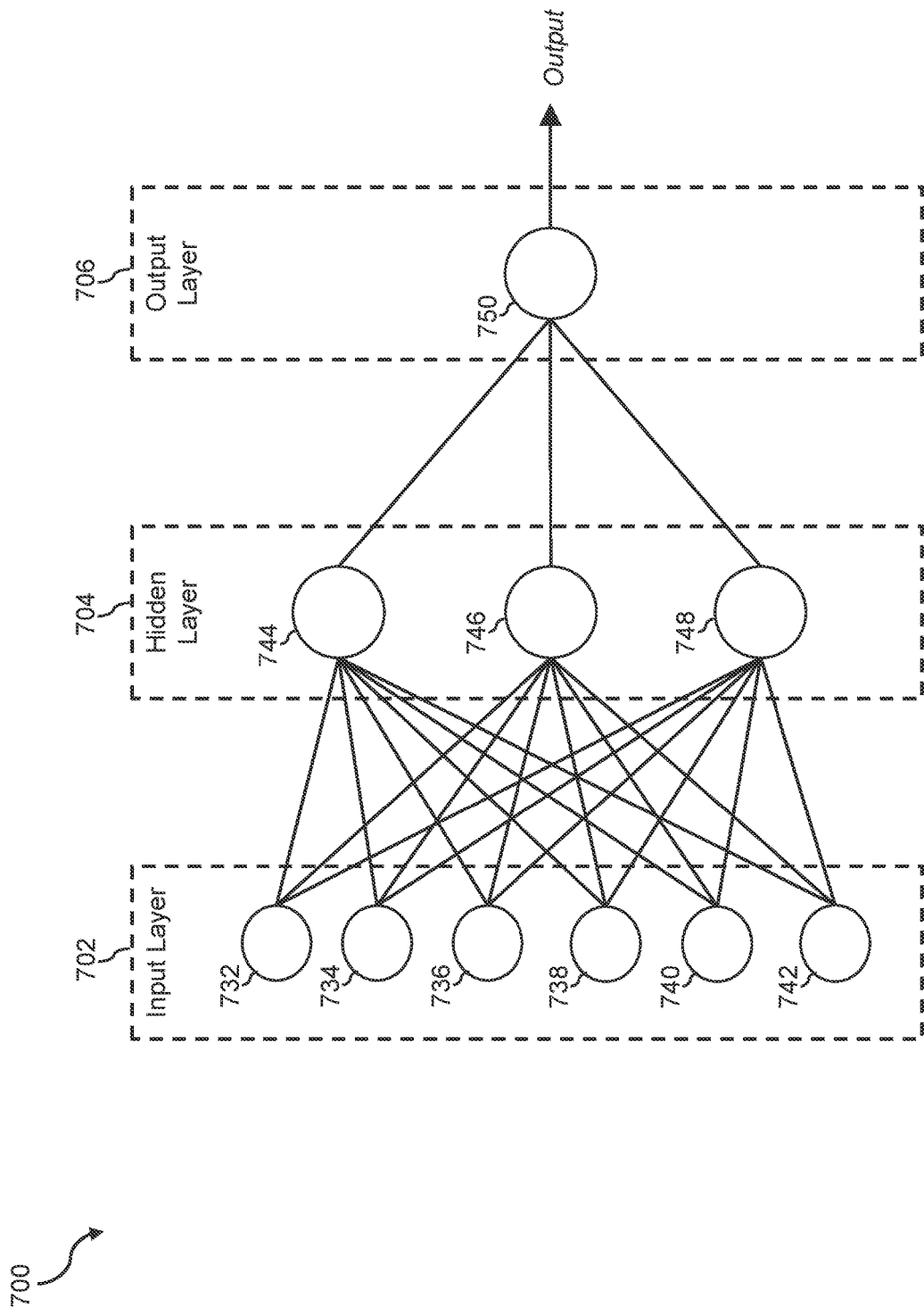
FIG. 7 illustrates an example neural network that can be used to implement a machine learning model according to an embodiment of the present disclosure.

FIG. 7 illustrates an example artificial neural network 700 that may be used to implement any machine learning models (e.g., the encoders 304, 314, 324, and 504, the decoders 308, 318, 328, and 508, and the models 204, 206, and 208, etc.). As shown, the artificial neural network 700 includes three layers—an input layer 702, a hidden layer 704, and an output layer 706. Each of the layers 702, 704, and 706 may include one or more nodes. For example, the input layer 702 includes nodes 732, 734, 736, 738, 740, and 742, the hidden layer 704 includes nodes 744, 746, and 748, and the output layer 706 includes a node 750. In this example, each node in a layer is connected to every node in an adjacent layer. For example, the node 732 in the input layer 702 is connected to all of the nodes 744, 746, and 748 in the hidden layer 704. Similarly, the node 744 in the hidden layer is connected to all of the nodes 732, 734, 736, 738, 740, and 742 in the input layer 702 and the node 750 in the output layer 706. Although only one hidden layer is shown for the artificial neural network 700, it has been contemplated that the artificial neural network 700 used to implement any one of the computer-based models may include as many hidden layers as necessary.

In this example, the artificial neural network 700 receives a set of inputs and produces an output. Each node in the input layer 702 may correspond to a distinct input. For example, when the artificial neural network 700 is used to implement the encoder 304, each node in the input layer 702 may correspond to one of the features 212, 214, 216, 218, and 220. When the artificial neural network 700 is used to implement the decoder 308, each node in the input layer 702 may correspond to an intermediate representation in the set of intermediate representations 306. When the artificial neural network 700 is used to implement a model (e.g., the model 204, 206, and 208), each node in the input layer 702 may correspond to a representation in the set of the representations 350.

In some embodiments, each of the nodes 744, 746, and 748 in the hidden layer 704 generates a representation, which may include a mathematical computation (or algorithm) that produces a value based on the input values received from the nodes 732, 734, 736, 738, 740, and 742. The mathematical computation may include assigning different weights (e.g., node weights, etc.) to each of the data values received from the nodes 732, 734, 736, 738, 740, and 742. The nodes 744, 746, and 748 may include different algorithms and/or different weights assigned to the data variables from the nodes 732, 734, 736, 738, 740, and 742 such that each of the nodes 744, 746, and 748 may produce a different value based on the same input values received from the nodes 732, 734, 736, 738, 740, and 742. In some embodiments, the weights that are initially assigned to the input values for each of the nodes 744, 746, and 748 may be randomly generated (e.g., using a computer randomizer). The values generated by the nodes 744, 746, and 748 may be used by the node 750 in the output layer 706 to produce an output value for the artificial neural network 700. When the artificial neural network 700 is used to implement one of the encoders 304, 314, and 324 configured to reduce the set of input features into a set of intermediate representations of the input features, the output value(s) produced by the artificial neural network 700 may include the set of intermediate representations of the input features. When the artificial neural network 700 is used to implement one of the decoders 308, 318, and 328 configured to expand a set of intermediate representations back to the input features, the output value(s) produced by the artificial neural network 700 may include the set of input features. When the artificial neural network 700 is used to implement a model (e.g., models 204, 206, and 208) configured to an output associated with a transaction request, the output value produced by the artificial neural network 700 may indicate a risk (e.g., a risk score) or an identifier or a product, or any other types of indications related to the transaction request.

The artificial neural network 700 may be trained by using training data and one or more loss functions. By providing training data to the artificial neural network 700, the nodes 744, 746, and 748 in the hidden layer 704 may be trained (adjusted) based on the one or more loss functions such that an optimal output is produced in the output layer 706 to minimize the loss in the loss functions. By continuously providing different sets of training data and penalizing the artificial neural network 700 when the output of the artificial neural network 700 is incorrect (as defined by the loss functions, etc.), the artificial neural network 700 (and specifically, the representations of the nodes in the hidden layer 704) may be trained (adjusted) to improve its performance in name entity recognition. Adjusting the artificial neural network 700 may include adjusting the weights associated with each node in the hidden layer 704.

Figure 8:
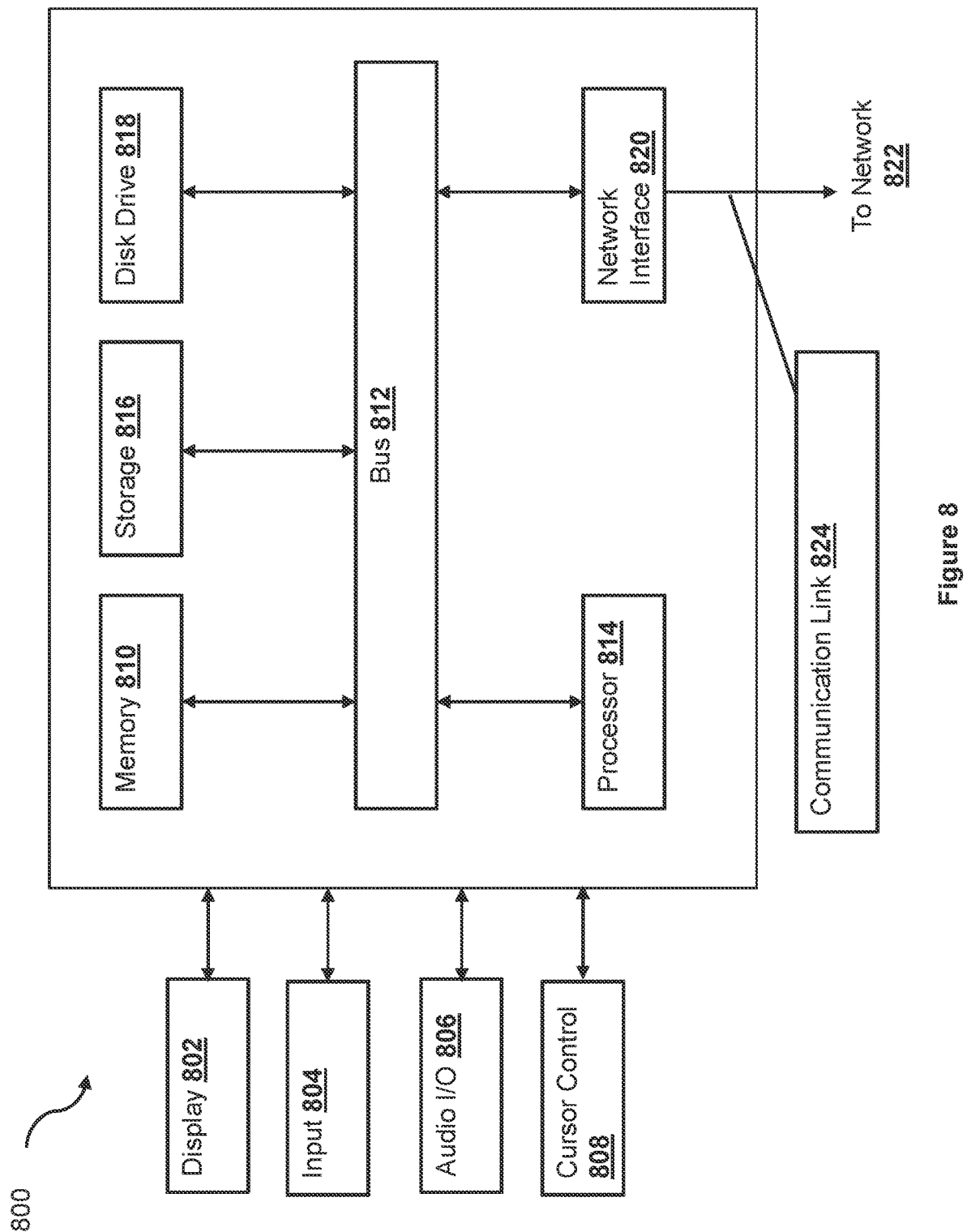
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the merchant server 120, the user device 110, and the servers 180 and 190. In various implementations, the user device 110 may include a mobile cellular phone, personal computer (PC), laptop, wearable computing device, etc. adapted for wireless communication, and each of the service provider server 130, the merchant server 120, and the servers 180 and 190 may include a network computing device, such as a server. Thus, it should be appreciated that the devices 110, 120, 130, 180, and 190 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the machine learning model configuration functionalities described herein, for example, according to the process 600.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   receiving a transaction request for processing a transaction using a machine learning model, wherein the machine learning model is configured to evaluate the transaction based on data obtained from a plurality of data servers;
   obtaining, from a first data server of the plurality of data servers, a first set of attribute values corresponding to a first set of attributes and associated with the transaction request;
   obtaining, from a second data server of the plurality of data servers, a second set of attribute values corresponding to a second set of attributes and associated with the transaction request;
   determining that a third set of attribute values from a third data server of the plurality of data servers is inaccessible by the system, wherein the third set of attributes corresponds to a third set of attributes and is associated with the transaction request;
   in response to determining that the third set of attribute values is inaccessible by the system, (i) providing the first set of attribute values to a first encoder configured to produce a first vector representation of the first set of attribute values in a multi-dimensional space, (ii) providing the second set of attribute values to a second encoder configured to produce a second vector representation of the second set of attribute values in the multi-dimensional space, and (iii) generating input values for the machine learning model based on the first vector representation produced by the first encoder and the second vector representation produced by the second encoder without any contribution from a third encoder that is configured to produce a third vector representation of the third set of attribute values in the multi-dimensional space, wherein the first encoder, the second encoder, and the third encoder are trained jointly based on a loss function related to minimizing a difference among the first vector representation of the first set of attribute values, the second vector representation of the second set of attribute values, and the third vector representation of the third set of attribute values;
   providing the input values to the machine learning model; and
   processing the transaction based on an output of the machine learning model.

2. The system of claim 1, wherein the operations further comprise:
   determining an interruption of the second data server; and
   excluding the second data server from consideration by the machine learning model without re-training the machine learning model, wherein the excluding the second data server comprises excluding the second encoder from processing subsequent transaction requests.

3. The system of claim 1, wherein the operations further comprise:
   adding a fourth data server for consideration by the machine learning model without re-training the machine learning model, wherein the adding the fourth data server comprises:
   generating a fourth encoder for the fourth data server; and
   training the fourth encoder to minimize a variance among outputs from the first encoder, the second encoder, the third encoder, and the fourth encoder.

4. The system of claim 3, wherein the operations further comprise:
   obtaining, from the fourth data server, a fourth set of attribute values associated with the transaction request; and
   providing the fourth set of attribute values to the fourth encoder configured to produce a fourth vector representation of the fourth set of attribute values, wherein the input values for the machine learning model are determined further based on the fourth vector representation.

5. The system of claim 1, wherein the input values comprise averages of the first and second vector representations.

6. The system of claim 1, wherein the first encoder is trained further based on outputs of the machine learning model.

7. The system of claim 1, wherein the generating the input values comprises performing a calculation based on the first vector representation and the second vector representation.

8. A method, comprising:
   receiving, by one or more hardware processors, a transaction request for processing a transaction using a machine learning model, wherein the machine learning model is configured to evaluate the transaction based on data obtained from a plurality of data sources;
   obtaining, by one or more hardware processors and from a first data source of the plurality of data sources, a first set of attribute values corresponding to a first set of attributes and associated with the transaction request;
   obtaining, by the one or more hardware processors from a second data source of the plurality of data sources, a second set of attribute values corresponding to a second set of attributes and associated with the transaction request;
   determining, by the one or more hardware processors, that a third set of attribute values from a third data source of the plurality of data sources is inaccessible by the one or more hardware processors, wherein the third set of attributes corresponds to a third set of attributes and is associated with the transaction request;
   in response to determining that the third set of attribute values is inaccessible, (i) providing, by the one or more hardware processors, the first set of attribute values to a first encoder configured to produce a first set of intermediate representations representing the first set of attribute values, (ii) providing, by the one or more hardware processors, the second set of attribute values to a second encoder configured to produce a second set of intermediate representations representing the second set of attribute values, and (iii) generating, by the one or more hardware processors, a set of representations for the machine learning model based on the first set of intermediate representations and the second set of intermediate representations, without using a third encoder that is configured to produce a third set of intermediate representations representing the third set of attribute values, wherein the first encoder, the second encoder, and the third encoder are trained jointly based on a loss function related to minimizing a difference among the first set of intermediate representations, the second set of intermediate representations, and the third set of intermediate representations;

providing the set of representations to the machine learning model; and processing the transaction request based on an output of the machine learning model.

9. The method of claim 8, wherein the first data source is an internal data source associated with an organization, and wherein the second data source is an external data source external to the organization.

10. The method of claim 8, wherein the first set of attribute values comprises a different number of values than the second set of attribute values, wherein the first encoder is further configured to encode the first set of attribute values into the first set of intermediate representations having a particular number of values, and wherein the second encoder is further configured to encode the second set of attribute values into the second set of intermediate representations having the particular number of values.

11. The method of claim 8, wherein the determining the set of representations comprises performing a calculation based on the first set of intermediate representations and the second set of intermediate representations.

12. The method of claim 11, wherein the calculation comprises an average operation.

13. The method of claim 8, further comprising:
determining an interruption of the second data source; and
excluding the second data source from consideration by the machine learning model without re-training the machine learning model, wherein the excluding the second data source comprises excluding the second encoder from processing subsequent transaction requests.

14. The method of claim 13, further comprising:
obtaining, from the first data source, a fourth set of attribute values associated with a second transaction request;
providing the fourth set of attribute values to the first encoder configured to produce a fourth set of intermediate representations representing the fourth set of attribute values;
determining input values for the machine learning model based on the fourth set of intermediate representations generated by the first encoder and without using the second encoder and the third encoder;
providing the input values to the machine learning model; and
processing the second transaction request based on a second output of the machine learning model.

15. A non-transitory machine-readable medium having stored thereon machine-readable instructions executable to cause a machine to perform operations comprising:
receiving a request for processing an electronic transaction using a machine learning model, wherein the machine learning model is configured to evaluate the electronic transaction based on data obtained from a plurality of data sources;

obtaining, from a first data source of the plurality of data sources, a first set of attribute values corresponding to a first set of attributes and associated with the electronic transaction;
obtaining, from a second data source of the plurality of data sources, a second set of attribute values corresponding to a second set of attributes and associated with the electronic transaction;
determining that a third set of attribute values from a third data source of the plurality of data sources is unavailable to the machine, wherein the third set of attributes corresponds to a third set of attributes and is associated with the electronic transaction;
in response to determining that the third set of attribute values is unavailable, (i) providing the first set of attribute values to a first encoder configured to produce a first representation of the first set of attribute values, (ii) providing the second set of attribute values to a second encoder configured to produce a second representation of the second set of attribute values, and (iii) generating input values for the machine learning model based on the first representation and the second representation without using a third encoder configured to produce a third representation of the third set of attribute values, wherein the first encoder, the second encoder, and the third encoder are trained jointly using a loss function for minimizing a variance among the first representation, the second representation, and the third representation; and
processing the electronic transaction based on an output of the machine learning model using the input values.

16. The non-transitory machine-readable medium of claim 15, wherein the first representation comprises a first vector in a multi-dimensional space, and wherein the second representation comprises a second vector in the multi-dimensional space.

17. The non-transitory machine-readable medium of claim 16, wherein the operations further comprise:
determining the multi-dimensional space for the first encoder, the second encoder, and the third encoder; and
configuring input features of the machine learning model based on the multi-dimensional space.

18. The non-transitory machine-readable medium of claim 15, wherein the operations further comprise:
adding a fourth data source for consideration by the machine learning model without re-training the machine learning model, wherein the adding the fourth data source comprises generating a fourth encoder for the fourth data source; and
training the fourth encoder to minimize a variance among outputs that are associated with a same transaction from the first encoder, the second encoder, the third encoder, and the fourth encoder.

19. The non-transitory machine-readable medium of claim 18, wherein the operations further comprise:
obtaining, from the fourth data source, a fourth set of attribute values associated with the electronic transaction; and
providing the fourth set of attribute values to the fourth encoder configured to produce a fourth representation of the fourth set of attribute values, wherein the input values for the machine learning model are determined further based on the fourth representation.

20. The non-transitory machine-readable medium of claim 15, wherein the input values comprise averages of the first and second representations.

* * * * *